May 23, 1933.  J. V. CAPUTO  1,910,882
ELECTRODE
Filed July 8, 1931   5 Sheets-Sheet 1
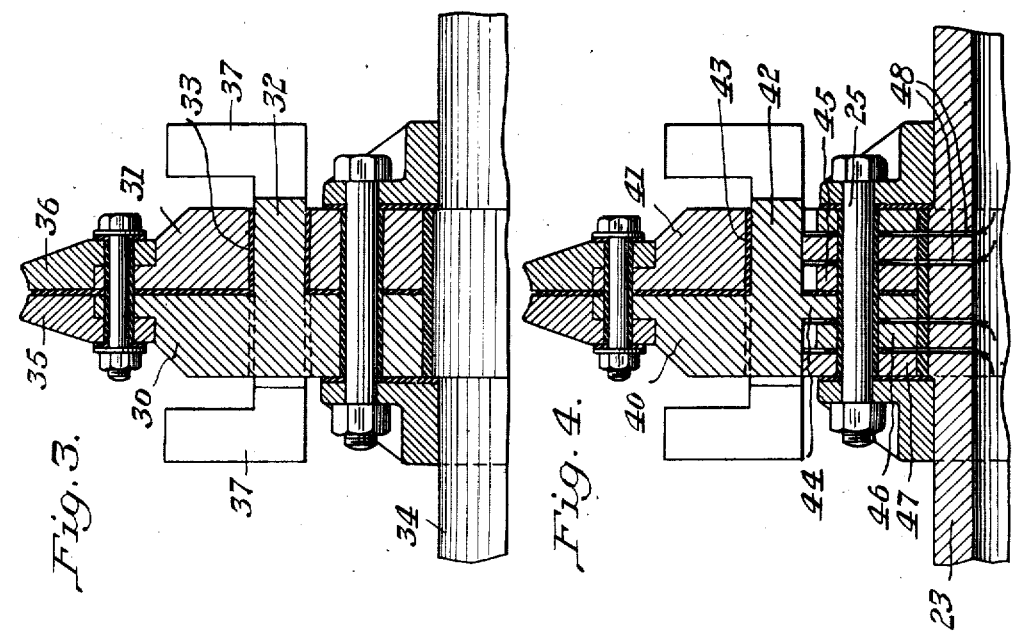
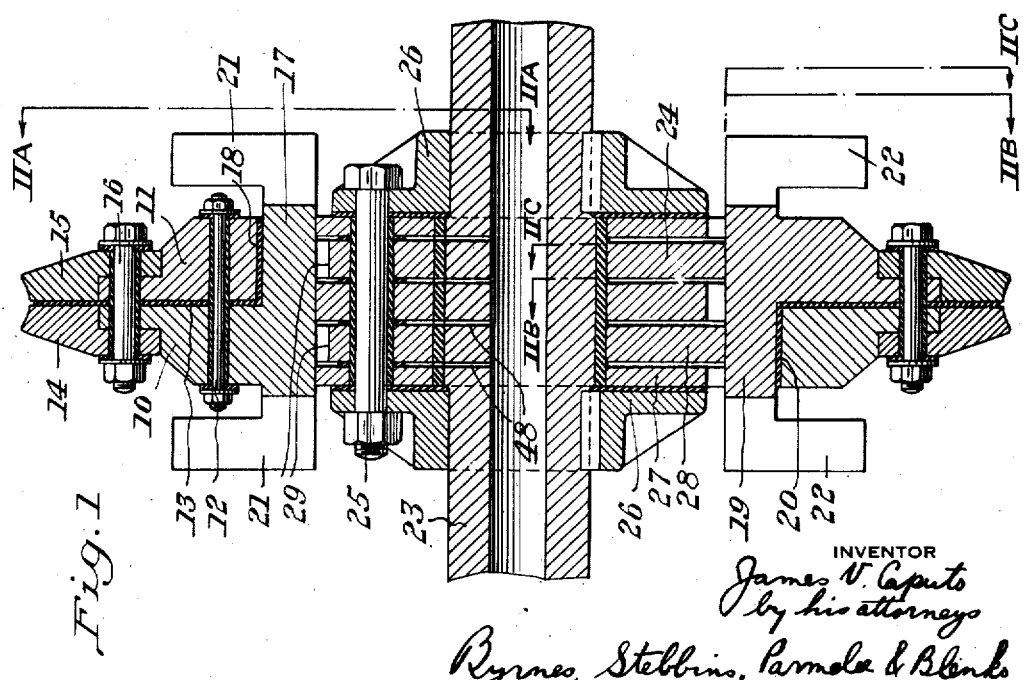
INVENTOR
James V. Caputo
by his attorneys
Byrnes, Stebbins, Parmele & Blenks

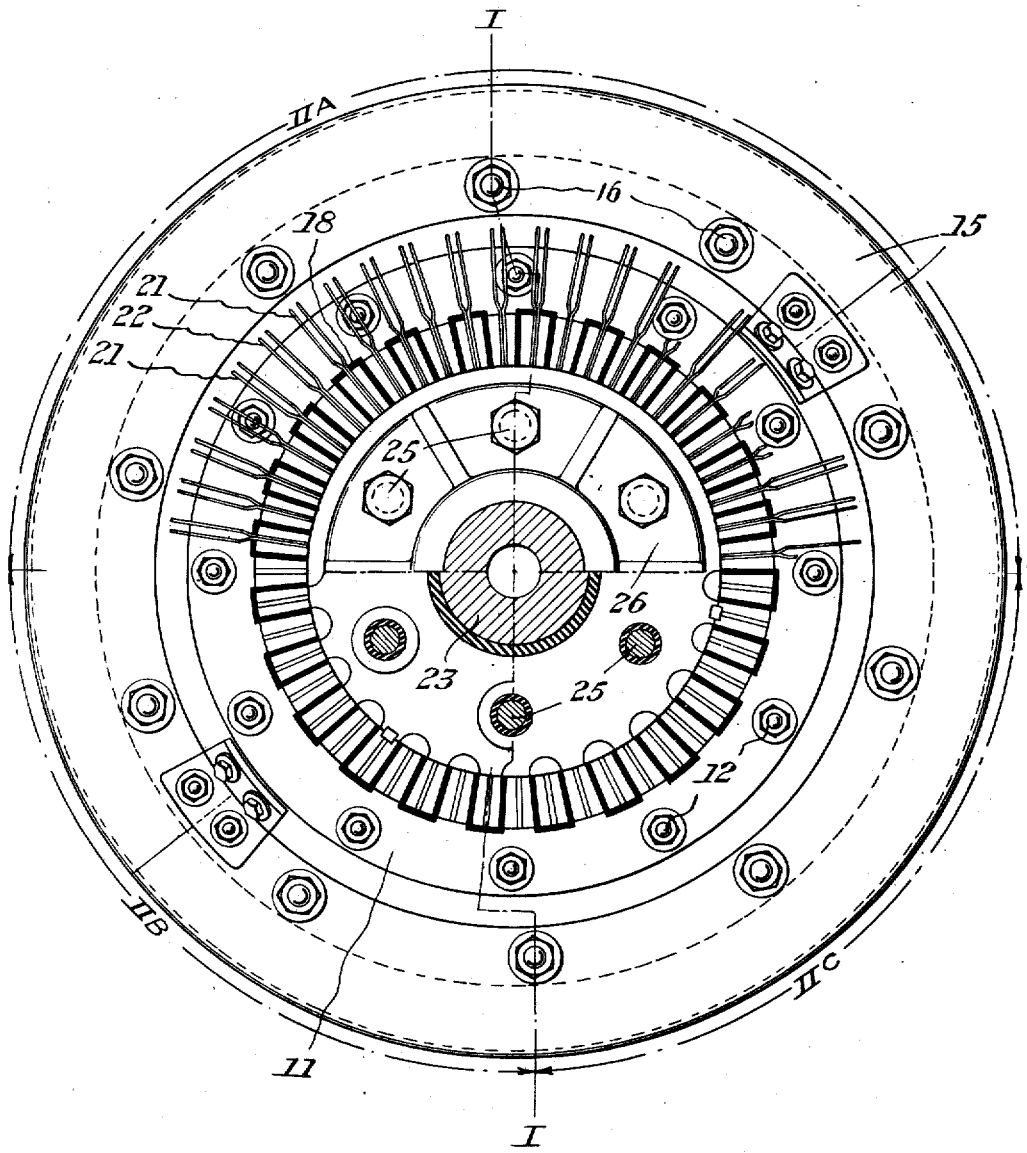

May 23, 1933.    J. V. CAPUTO    1,910,882
ELECTRODE
Filed July 8, 1931    5 Sheets-Sheet 3

INVENTOR
James V. Caputo
by his attorneys
Byrnes, Stebbins, Parmelee & Blenko

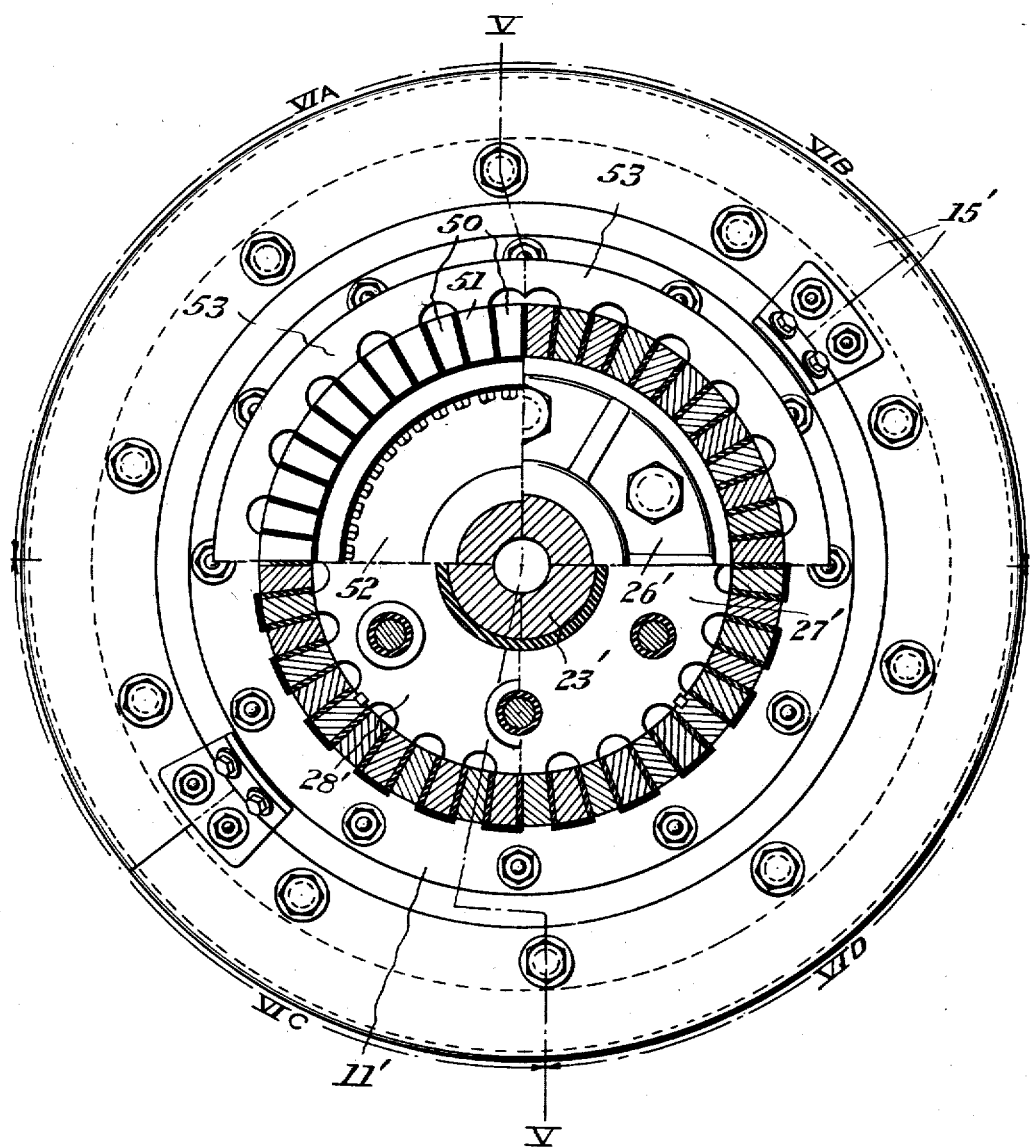

May 23, 1933.  J. V. CAPUTO  1,910,882

ELECTRODE

Filed July 8, 1931   5 Sheets-Sheet 5

INVENTOR
James V. Caputo
by his attorney
Byrnes, Stebbins, Parmelee & Blenko

Patented May 23, 1933

1,910,882

UNITED STATES PATENT OFFICE

JAMES V. CAPUTO, OF GIRARD, OHIO

ELECTRODE

Application filed July 8, 1931. Serial No. 549,441.

My invention relates to electrodes for electric welding apparatus and, in particular, to rotary electrodes for continuous resistance welding machines.

The present practice in the construction of electric welding machines contemplates the provision of an electrode comprising a pair of annular discs bolted together, but insulated from each other. Current is supplied to the insulated discs through slip rings from stationary transformers. It has also been suggested to utilize rotating transformers having connections to the electrode discs, as opposed to the sliding connections necessary where stationary transformers are employed. The constructions mentioned were originally proposed and have been found fairly satisfactory for the welding of thin gauge tubing in small sizes. When it is attempted to apply the same principles of construction, however, to welding machines for making large size, heavy-walled pipe, numerous difficulties are encountered.

The transmission of heavy alternating currents through solid masses of conducting material such as are necessary to prevent excessive power losses and voltage drop, is always accompanied by an eddy current loss and a loss due to the so-called "skin effect". As is well known, this refers to the tendency of the current to concentrate in the outer layers of the conducting material and to avoid the central portion thereof to a large extent. There is, of course, also, a certain power loss which is inevitable and a certain voltage drop in the conducting portions of any electrode. In addition, a considerable reactance drop is effective to reduce the power factor of the welding current and to increase the heating of the electrode, since a greater current is thereby necessary for a given amount of energy transmitted.

Welding electrodes as heretofore constructed have been characterized by a comparatively high resistance of the path from the current supply transformers, whether stationary or rotating, to the point of application of the current. Usually the current is supplied to the electrode at spaced points around its periphery. It is necessary that all this current flow through the electrode to the point of tangency with the pipe being welded. This fact contributes to the power losses characteristic of previous types of electrodes because of the resistance of the path around the periphery of the electrode from points thereon remote from the point of tangency with the pipe.

It has also been necessary, because of the excessive losses occurring in the electrode, to provide means for artificially cooling the electrode by a stream of water to prevent it from heating to dangerously high temperatures.

I have invented an electrode for welding apparatus which minimizes the objections hereinabove mentioned. In the construction of my electrode, I make use of the fact that the magnetizing effects of currents traversing adjacent conductors in opposite directions largely neutralize each other. I also utilize the principle that the losses due to skin effect and eddy currents are reduced by using a plurality of parallel paths for a current instead of a single conductor.

Another important feature of the invention is the provision of short, by-passing circuits in parallel with the usual path around the periphery of the electrode from the transformers to the pipe being welded. These parallel paths reduce the resistance opposing the flow of welding current and cut down the power losses to a large extent. The reduction in power losses makes it possible to dispense with water cooling of the electrode and to rely solely on an air blast for cooling, or on natural radiation unassisted by artificial circulation.

In accordance with my invention, I construct a welding electrode of a pair of annular members secured together but insulated from each other. Contact rims may be secured respectively to the annular members for engagement with the pipe being welded. The annular members are provided with interfitting projections and recesses which provide terminals for both members on both sides of the electrode. This construction facilitates the connection of a plurality of transformers to the electrode and is useful in connection with either rotating or stationary transformers. The annular members are supported on a shaft by means of a spider built up from a plurality of conducting discs or rings secured together but insulated from each other and from the shaft. The outer peripheries of the rings are notched or recessed, forming teeth or projections thereon adapted to engage the projections of one or the other of said annular members alternately.

These spider rings provide a plurality of parallel paths for the welding current. It is not necessary, therefore, for the entire current to traverse the periphery of the electrode, but it is possible for a major portion of the current to take a shorter, more direct path. In actual practice, calculations show that the long path around the periphery of the electrode carries only ten percent of the total welding current, whereas the short, parallel, by-passing paths carry about ninety percent.

In a modification of this construction adapted for use especially with stationary transformers, the interfitting projections on the annular members are provided with lateral extensions. The plurality of slip rings having their inner peripheries provided with tooth-like projections similar to those of the spider rings above mentioned, are seated on said extensions so as to have contact only with the extensions integral with one or the other of said annular members. By this construction, it is possible to supply current of either instantaneous polarity to both sides of the electrode and at any point adjacent the circumference thereof. The construction is thus an improvement over those known heretofore, in that it permits the transformers supplying current to the electrode to be located in almost any convenient position close to the electrode. It is not necessary, as heretofore, for the transformer to straddle the electrode.

In a further modification of the invention, I replace the spider rings supporting annular members of the electrodes by a solid spider and provide the slip rings with notched discs, forming by-passing circuits for the welding current. If desired, the slip rings and the notched discs may be made integral, although in this application they are shown constructed in two parts. I am thus able to take advantage of the reduction in the resistance of the path of the welding current, which is the result of the provision of a plurality of parallel paths for the welding current, in the case of a stationary supply transformer, as well as a rotating transformer.

For a complete understanding of the invention, reference is made to the accompanying drawings illustrating a present preferred embodiment of the invention and the modification thereof previously mentioned.

In the drawings:

Figure 1 is a transverse sectional view of a welding electrode embodying the invention, Figure 2 is a composite sectional view along the line IIA—IIA, IIB—IIB, and IIC—IIC of Figure 1, the portions of Figure 2 corresponding to the different section lines of Figure 1, being appropriately designated; line I—I of Figure 2 indicates the plane of the section shown in Figure 1, Figure 3 is a partial sectional view similar to Figure 1 illustrating a modification thereof, Figure 4 is a view similar to Figure 3, illustrating a further modification, Figure 5 is a view similar to Figure 1, illustrating a form of the electrode adapted for use with stationary transformers, Figure 6 is a composite sectional view similar to Figure 2, the planes of section being indicated in Figure 5 by the lines VI—A, VI—B, VI—C, etc.

Figure 7:
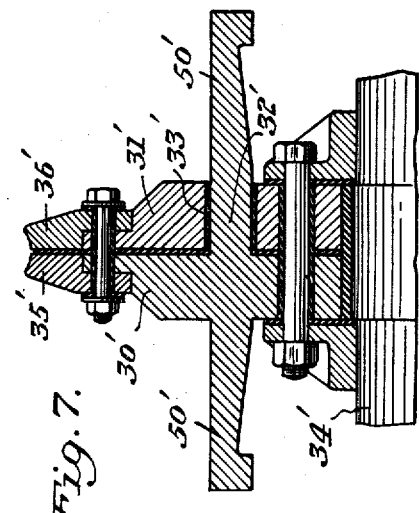
Figure 7 is a partial sectional view similar to Figure 5 showing a modification.

Referring now in detail to the drawings and, for the present, to Figures 1 and 2, the electrode of my invention comprises a pair of annular members 10 and 11 secured together, for example, by bolts 12, but insulated from each other by an insulating layer 13. The outer peripheries of the members 10 and 11 may be suitably shaped to receive contact rims 14 and 15 secured together and to the members 10 and 11 by bolts 16. The bolts 16 and the rims 14 and 15 are insulated similarly to the members 10 and 11 and the bolts 12. The rims 14 and 15, however, have firm electrical contact, respectively, with the members 10 and 11.

The inner peripheries of the members 10 and 11 are provided with alternating projections and recesses preferably in the form of axial slots and fingers 17 and 18. The two members are identical in construction so that when disposed face to face they may be brought together axially until the projections 18 on the member 10 lie in and extend through recesses 17 on the oppositely disposed member 11. Similarly, projections 19 on the member 11 fit into recesses 20 on the member 10. This construction provides terminals 21 on both sides of the electrode for current of one instantaneous polarity and terminals 22 on both sides of the electrode for current on the other instantaneous polarity.

The form of the invention shown in Figures 1 and 2 contemplates that a plurality of step-down transformers will be mounted on a shaft 23 on which the electrode is carried. From the transformers, positioned symmetrically on the shaft in groups on both sides of the electrode, short direct connections extend to the terminals 21 and 22. Welding current is thus supplied substantially uniformly at all points on the periphery of the annular members 10 and 11 making up the body of the electrode. In other words, current flows toward the electrode uniformly around its circumference. In the continuous welding of pipe by the resistance method, the current delivered by the electrode leaves the latter at substantially a single point, namely the point of tangency with the pipe being welded. The current from the electrode terminals diametrically opposite to the point of tangency would ordinarily, therefore, have to flow through the entire semi-circumference of the electrode in order to reach the point of use. The length of this path, the cross-sectional area thereof, and the magnitude of the current carried thereby, all contribute to the production of results which are very undesirable such, for example, as high voltage drop and power losses due to the resistance of the path, a high reactance drop which lowers the power factor, as well as the tendency to produce eddy currents and undue heating of the electrode because of skin effects.

In order to overcome the objectionable results mentioned, I support the electrode on the shaft 23 by means of a spider 24 built up of a plurality of conducting discs secured together by means of bolts 25 but insulated from each other and from the bolts and shaft. The bolts 25 serve to draw the rings together by means of clamping rings 26. The spider 24 includes two sets of similar rings 27 and 28. The peripheries of all the rings are notched as at 29 whereby the rings engage the members 10 and 11 only at spaced points. The spacing between the notches or toothlike projections on rings 27 and 28 is identical with the spacing between the recesses 17 and projections 18 on the annular members 10 and 11. Alternate rings 27 and 28 are positioned so that their projections engage only the projection of one of the members 10 and 11 and successive rings axially of the shaft 23 engage the projections of different annular members.

Since the rings 27 and 28 have a rigid electrical contact with the projections from the members 10 and 11, the rings constitute short by-passes for the current supplied at points on the electrode remote from the point of tangency of the pipe being welded. The electrical resistance opposing the flow of such current is thereby reduced and likewise the power loss and voltage drop caused by such resistance. Since the rings 27 and 28 engage different annular members, they transmit current of opposite instantaneous polarity. The rings 27 and 28, as will be apparent from Figure 1, are interleaved so that the magnetic effect of the current transmitted thereby is practically neutralized with a consequent reduction in the reactance of the circuit and a corresponding increase in the power factor. Since current of either instantaneous polarity is split up among a plurality of parallel paths afforded by the sets of rings 27 and 28, the tendency for eddy currents to be created is reduced, as well as concentration of current in the outer layers of the conductors due to the skin effect which causes an apparent increase in the resistance of the circuit. The reduction in the various losses mentioned permits an electrode of given dimensions to handle a given amount of energy at a lower temperature than has been possible with previous types of electrode structures.

The short paths for the welding current, in parallel with the path through the periphery of the electrode, which are provided by the spider rings, greatly reduce the total resistance opposing the flow of welding current. This reduction of resistance, of course, makes it possible to operate with a greater efficiency and with a lower electrode temperature without water-cooling. Although air blast cooling is contemplated, the reduction of electrode losses is so marked as to justify reliance upon natural radiation alone to keep the electrode temperature within safe limitations.

Referring now to Figure 3, a modified form of electrode is shown which comprises annular members 30 and 31 having alternating interfitting projections 32 and recesses or holes 33. The members 30 and 31 are constituted by unitary castings extending from the shaft 34 to the rims 35 and 36. Terminals 37 facilitate the connection of transformers to the electrode. Since short by-passing circuits for the current supplied at different points around the electrode are formed of solid castings, the construction shown in Figure 3 is not as effective in reducing the losses due to eddy currents and skin effect as is that shown in Figure 2. The modification of Figure 3, however, does produce a large reduction in resistance and reactance and can be arranged with a plurality of interleaved rings as in Figure 1 to reduce the eddy current and skin effect to a minimum, as shown in Figure 4.

In Figure 4 an electrode is composed of annular members 40 and 41 having interfitting projections and recesses 42 and 43. The annular members 40 and 41 are provided with integral, inwardly extending rings 44 and 45 similar to the spider rings shown in Figure 1. Additional rings 46 and 47 complete the spider, but are made separately and then incorporated in the electrode structure.

The modification of Figure 4, therefore, is substantially identical with that shown in Figure 1, except that a spider ring is formed integral with each of the annular members. In Figure 4, too, there are three spider rings for each annular member and the rings are of the same thickness. In Figure 1, the rings are divided three and two between the annular members, but have varying thicknesses to compensate for inequality in the number of rings. Obviously, the number and dimension of the rings can be varied to suit any particular case. In the modification shown in Figures 1 and 4, I preferably form vent holes 48 in the shaft for supplying cooling air to the spaces between the rings, which escapes between the insulating washers surrounding the bolts 25 and then passes over the surface of the annular members to cool them also.

Figure 5:
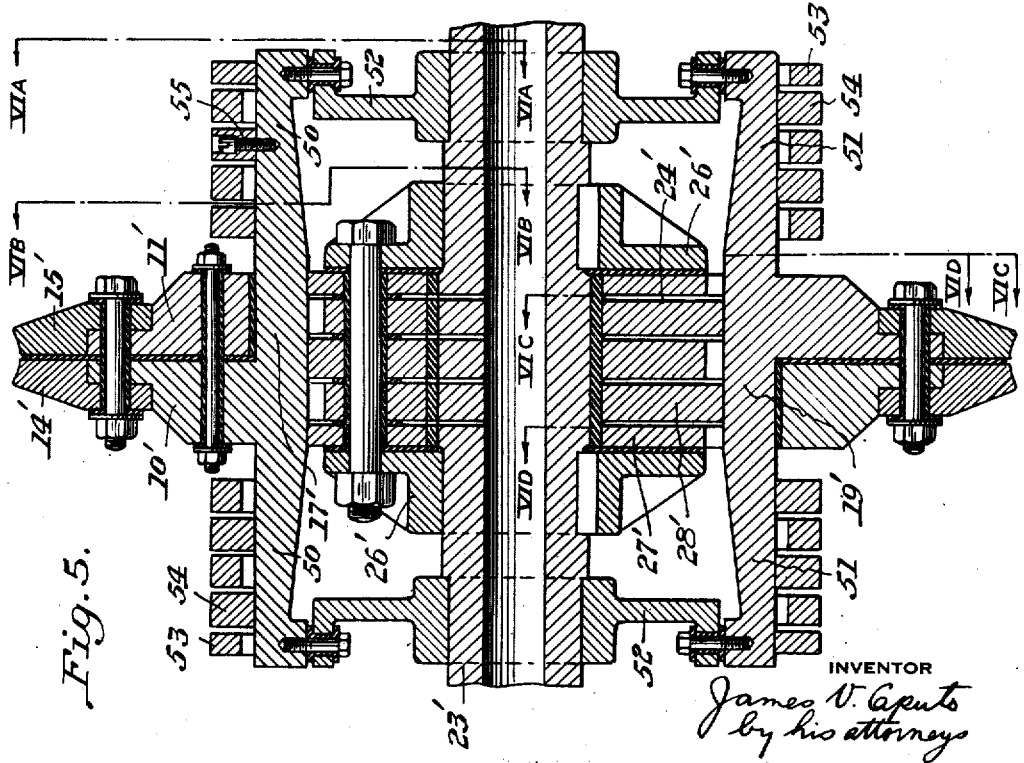

Referring now to Figures 5 and 6, I have illustrated therein a form of the invention similar to that shown in Figures 1 and 2 with the added feature that slip rings are provided so that stationary transformers may be employed to supply current to the electrode. Since the construction illustrated in Figures 5 and 6 is substantially that shown in Figure 1, together with certain additional features, the elements common to the two forms of the invention will be indicated in Figure 5 by the same reference numerals used in Figure 1, with a superscript attached.

As shown in Figures 5 and 6, the electrode comprises annular members 10' and 11' surrounded by contact rims 14' and 15'. The electrode is carried on a shaft 23' by means of a spider 24' comprising an assembly of sets of similar discs 27' and 28'.

The projections 17' and 19' of the members 10' and 11', instead of having transformer terminals secured thereto, are provided with lateral extensions 50 and 51, respectively, projecting outwardly on both sides of the electrode. In order to support the extensions 50 and 51, bracing rings 52 are seated on the shaft 23'.

Current is supplied to the extensions 50 and 51 through slip rings 53 and 54. These rings have their inner peripheries toothed or notched similar to the outer peripheries of the rings 27' and 28'. The rings 53 are pressed over the lateral extensions 50 and 51 so that their teeth engage only the extensions 51. The rings 54 are similarly positioned so that their teeth engage only the projections 50. Since the successive rings are thus of alternate instantaneous polarity, all the transformer terminals may be connected to brushes engaging slip rings on one side only of the electrode, or transformers may be positioned on both sides and connected to both halves of the electrodes by short direct connections. It is not necessary that the transformer straddle the electrode so as to have its terminals accessible on both sides of the latter. It is also possible to distribute the transformers around the electrode and the location thereof need not be limited to any one point.

Since the slip rings are interleaved in the same manner as the spider rings, it will be apparent that they also have the effect of reducing eddy currents, skin effect and reactance drop. These results in a large measure offset the chief objection to the use of stationary electrodes which heretofore has been the excessive losses therein. With the improved construction, the losses due to the factors mentioned already are reduced to such an extent that the contact loss between the brushes and slip rings can be tolerated and a satisfactory efficiency obtained nevertheless.

The slip rings may be secured to the extensions 50 and 51 by means of machine screws 55 if desired, or a press fit may be employed.

Figure 7 shows a modification of the construction shown in Figures 5 and 6 which is similar to that shown in Figure 3.

Figure 8:
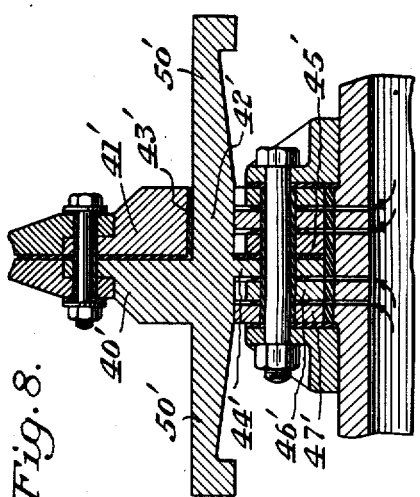
Figure 8 is a view similar to Figure 7, showing a further modification.

Figure 8 is likewise similar to Figure 4, except that it is adapted by the construction shown in Figure 5 for use with stationary transformers. In Figures 7 and 8 the features common to the modifications for both stationary and rotatable transformers are indicated by the same reference numerals used in Figures 3 and 4, with a superscript. Similarly, the features common to Figures 5, 7 and 8 are indicated by the same numerals with a superscript. The modifications shown in Figures 7 and 8 have the specific advantages already pointed out in connection with those shown in Figures 3 and 4.

Figure 9:
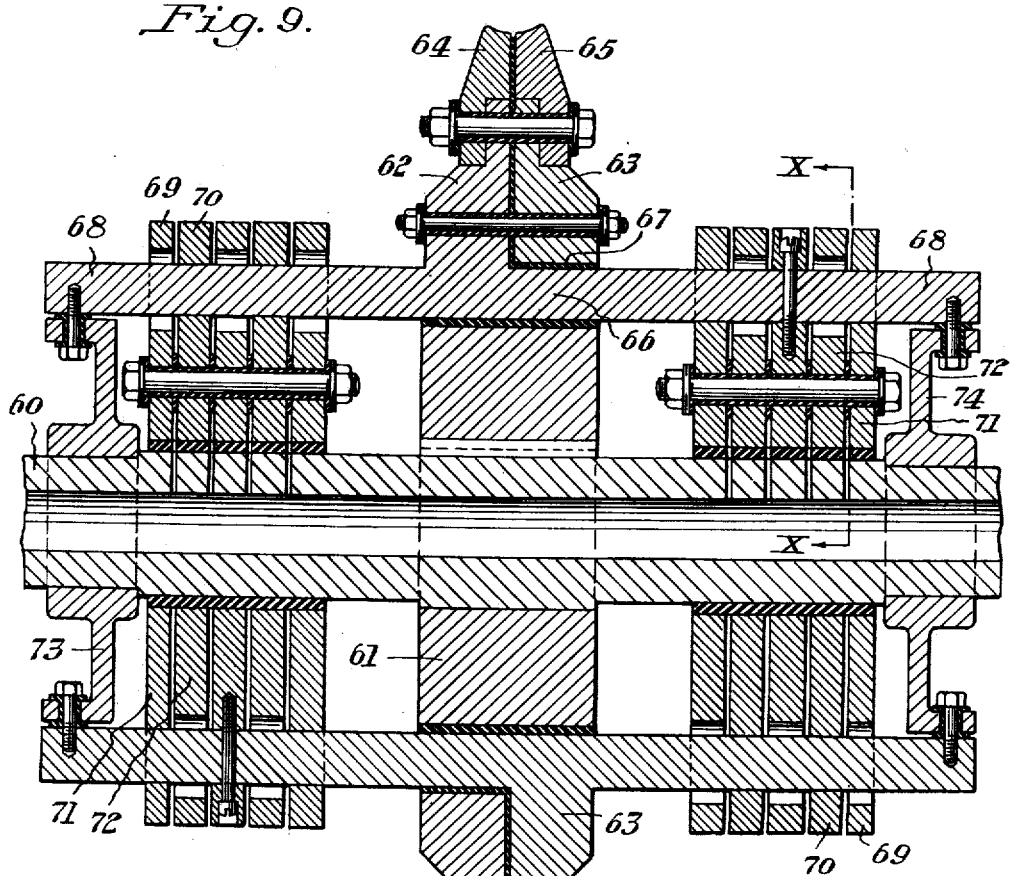
Figure 9 is a sectional view of a further modified form of electrode in which the slip rings are provided with parallel paths for the welding current.
Figure 10:
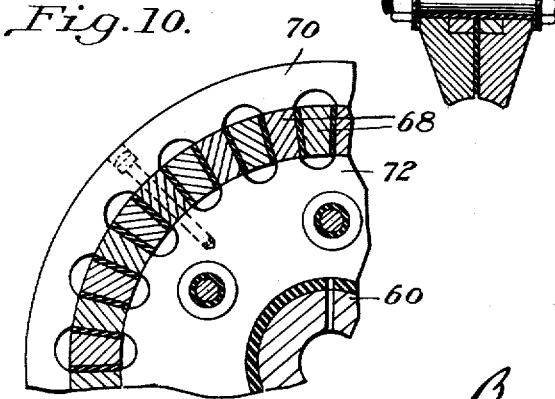
Figure 10 is a partial sectional view along the line X—X of Figure 9.

Figures 9 and 10 illustrate a further modified form of the invention which is adapted for use in connection with stationary transformers. A shaft 60 carries a spider 61 on which is supported annular members 62 and 63, insulated from each other and from the spider. Contact rims 64 and 65 are carried by the annular members 62 and 63. The latter are similar to those which have previously been described and are provided with interfitting fingers 66 and recesses 67. The fingers 66 have extensions 68 extending laterally of the annular members.

Slip rings 69 and 70 of opposite instantaneous polarity are seated upon the extensions 68 and have their inner peripheries notched so that they engage only extensions of one polarity.

Within the cylindrical space defined by the extension 68, a plurality of rings or discs 71 and 72 are positioned. These discs have their outer peripheries notched and are arranged similarly to the slip rings 69 and 70. The discs 71 and 72 provide short, low-resistance paths from different points on the periphery of the slip rings 69 and 70 to points on the rims 64 and 65 tangent to the pipe being welded. A large majority of the welding current flows through the discs 71 and 72 and only a small portion flows around the periphery of the electrode proper.

Bracing rings 73 and 74 are employed as previously described.

Instead of forming the slip rings 69 and 70 and the discs or rings 71 and 72 separately, a slip ring and disc may be formed in one integral member. In order to do this, it is necessary to reduce the thickness of the extension 68 to provide continuous webs therebetween, connecting the slip ring and its by-passing disc.

From the foregoing description, it will be apparent that the invention is characterized by numerous advantages of outstanding importance. In the first place, by providing short by-passes for the current supplied to the electrode at points remote from the point of tangency with the pipe being welded, the resistance encountered by the welding current is considerably reduced, and this alone reduces the power loss and voltage drop. Similar results are effected by the reduction in the eddy currents and skin effect which is produced by interleaving conductors of opposite polarity and by utilizing a plurality of relatively small conductors rather than one conductor of large cross section. This interleaving of the conductors also reduces the reactance drop, which improves the power factor of the load. The decreased resistance and reactance drops, of course, improve the regulation of the system and reduce the heating of the electrodes due to copper loss therein. Because of the reduction in the electrode losses, the capacity of the transformers need not be as great as is necessary in connection with previous electrode constructions.

Since the invention provides for the connection of transformers on both sides of the electrode to a plurality of points around the circumference thereof, by means of short direct leads, the resistance and reactance drops between the transformer and the electrode are reduced. Since the capacity of the transformers need not be as great for an electrode according to the present invention as for electrodes known previously, the cost of installation of a system including the invention is lowered, and because of the reduction in the power losses the cost of operation is likewise brought down. This makes it possible to reduce the cost of the finished product both in machines using stationary transformers, as well as those employing rotatable transformers.

Another advantage of the invention which has been previously mentioned is the fact that the electrode operates at a lower temperature, due to the reduction of the losses occurring therein. Water-cooling with its difficulties may, therefore, be omitted and an air blast through the hollow shafts supporting the electrode may be safely relied on for cooling. The electrode described herein may also be designed for cooling by natural radiation alone.

Although I have shown but a few of the possible modifications of the invention, it will be apparent that many changes in the construction shown and described can be made without departing from the spirit of the invention as set forth in the appended claims.

I claim:

1. A welding electrode comprising a pair of contact rolls insulated from each other but seated on and secured to discs disposed side by side and having interfitting projections and recesses affording connections to both discs on both sides of the electrode, and a plurality of rings secured together to form a spider supporting said discs, said rings having alternating projections and notches for engaging the projections of only one of said discs.

2. A welding electrode comprising a pair of annular members side by side, connected together, insulated from each other, and having interfitting projections and recesses, and a plurality of insulated rings clamped together to form a spider for supporting said members, said rings having recessed peripheries so as to engage the projections of only one of said members.

3. In a welding electrode, a pair of annular members having interfitting recesses and projections, and a plurality of insulated rings for supporting the members and electrically connecting portions thereof, said rings having recessed peripheries so as to engage the projections on only one of said members.

4. In a welding electrode, the combination with an annular member having circumferentially spaced projections on the inner edge thereof, of a ring adapted to lie within said member, and having peripheral projections engaging the projections on said member.

5. In a welder electrode, an annular member having inward projections spaced circumferentially thereof for the connection of current-supply means, and a ring in said annular member having outward projections engaging the inward projections of said member.

6. A welder electrode comprising a pair of annular members having interfitting portions, and a plurality of rings within said members and alternately engaging the interfitting portions of only one of said members, and means for securing said rings together to form a supporting spider for said members.

7. In an electrode, a pair of annular members having interfitting portions, and a plurality of rings seated within said members having projections for engaging said portions, alternate rings being positioned to engage portions of different members.

8. In an electrode, a pair of annular members having interfitting portions, and a plurality of rings seated within said members having projections for engaging said portions, alternate rings being positioned to engage portions of different members, one of said rings being integral with each of said members.

9. In a welder electrode, two juxtaposed discs, alternate holes and projections in said discs, the projections of each extending through the holes in the other, said discs having portions radially inward of said holes to provide a short path diametrically of the electrode.

10. A welding electrode comprising a pair of annular members secured together but insulated from each other, and having interfitting projections and recesses, lateral extensions from said projections and rings having spaced projections for engaging the extensions of only one of said members.

11. In an electrode structure, the combination with two annular members having interfitting recesses and projections, and lateral extensions on said projections, of rings having radial projections for engaging only the extensions from one of said members, said rings being disposed axially of the electrode so as to engage the extensions from said members alternately.

12. In an electrode, a conducting disc having lateral extensions on both sides of the electrode, and rings seated on said extensions.

13. In an electrode, a pair of annular members, lateral extensions from both of said members on one side of the electrode, and a plurality of rings engaging alternate extensions of only one of said members.

14. An electrode comprising a pair of annular members, lateral extensions from both members on either side of the electrode, slip rings alternately engaging said extensions, and a plurality of rings secured together within said members, said last-named rings engaging said extensions alternately.

15. In an electrode for welding, insulated annular members secured together, means for supplying welding current to said members adjacent their outer edges, and a plurality of rings within said members, alternate rings engaging different members, for providing interleaved diametrical circuits interconnecting relatively distant portions of said members.

16. In an electrode, an annular member, current supply means adjacent the periphery thereof, and means for interconnecting portions of said member by a plurality of interleaved circuits comprising a plurality of rings positioned within said member.

17. A welding electrode comprising a pair of juxtaposed annular members, and a plurality of rings alternately engaging said members to constitute interleaved interconnecting circuits between portions of said members.

18. In a welding electrode, a pair of annular members secured together but insulated from each other, projections from both said members extending on both sides of the electrode for supplying current thereto, and a plurality of rings supported on said projections beside the electrode, successive rings having engagement with projections of different annular members.

19. In a welding electrode, a pair of annular members disposed in side-by-side relation, projections from said members adjacent their periphery for supplying current thereto, and a plurality of discs associated with said projections constituting a relatively low impedance conducting path to the electrode periphery in parallel with the relatively high impedance path through said members.

20. In a welding electrode, a pair of annular members forming part of a relatively high impedance welding circuit, projections extending laterally from said members adjacent the periphery thereof, and a plurality of discs seated on said projections, said discs constituting parts of a relatively low impedance welding circuit.

21. In an electrode roll, a conducting disc having lateral extensions on both sides of the electrode, and additional discs seated on said extensions.

22. In a welding electrode comprising a pair of annular members secured together but insulated from each other, alternate holes and projections in said electrode, the projections of each extending through the holes in the other, lateral extensions from said projections, and discs adjacent said members having openings for receiving the extensions and engaging alternate extensions.

In testimony whereof I have hereunto set my hand.

JAMES V. CAPUTO.

CERTIFICATE OF CORRECTION.

Patent No. 1,910,882.  May 23, 1933.

JAMES V. CAPUTO.

It is hereby certified that error appears in the printed specification of the above numbered patent requiring correction as follows: Page 1, line 13, after "having" insert the word "fixed"; page 6, line 46, claim 14, strike out the word "slip"; and that the said Letters Patent should be read with these corrections therein that the same may conform to the record of the case in the Patent Office.

Signed and sealed this 8th day of August, A. D. 1933.

(Seal)

M. J. Moore.
Acting Commissioner of Patents.